(12) United States Patent
Kyriannis et al.

(10) Patent No.: US 12,184,484 B1
(45) Date of Patent: Dec. 31, 2024

(54) PROGRAMMABLE SWITCHING DEVICE FOR NETWORK INFRASTRUCTURES

(71) Applicant: AMYNA Systems, Hackensack, NJ (US)

(72) Inventors: James Kyriannis, Tenafly, NJ (US); Min Kyriannis, Tenafly, NJ (US)

(73) Assignee: AMYNA SYSTEMS INC., Hackensack, NJ (US)

( * ) Notice: Subject to any disclaimer, the term of this patent is extended or adjusted under 35 U.S.C. 154(b) by 0 days.

(21) Appl. No.: 18/819,101

(22) Filed: Aug. 29, 2024

Related U.S. Application Data

(63) Continuation of application No. 16/709,444, filed on Dec. 10, 2019, now abandoned.

(51) Int. Cl.
| | | |
|---|---|---|
| H04L 41/0803 | (2022.01) |
| H04L 9/40 | (2022.01) |
| H04L 41/0813 | (2022.01) |
| H04L 41/084 | (2022.01) |
| H04L 41/0893 | (2022.01) |
| H04L 41/16 | (2022.01) |
| H04L 43/06 | (2022.01) |
| H04L 49/10 | (2022.01) |

(52) U.S. Cl.
CPC ...... *H04L 41/0813* (2013.01); *H04L 41/0803* (2013.01); *H04L 41/0843* (2013.01); *H04L 41/0893* (2013.01); *H04L 41/16* (2013.01); *H04L 43/06* (2013.01); *H04L 49/10* (2013.01); *H04L 63/02* (2013.01); *H04L 63/0227* (2013.01); *H04L 63/0245* (2013.01); *H04L 63/10* (2013.01); *H04L 63/18* (2013.01); *H04L 63/20* (2013.01)

(58) Field of Classification Search
CPC ............ H04L 41/0813; H04L 41/0803; H04L 41/0843; H04L 41/0893; H04L 41/16; H04L 43/06; H04L 63/02; H04L 63/0227; H04L 63/0245; H04L 63/10; H04L 63/18; H04L 63/20; G06N 20/00
See application file for complete search history.

(56) References Cited

U.S. PATENT DOCUMENTS

| | | | | |
|---|---|---|---|---|
| 6,807,183 B1* | 10/2004 | Chow | ................ | H04L 49/3018 370/409 |
| 6,885,666 B1* | 4/2005 | Chow | .................. | H04L 45/502 370/503 |
| 7,310,306 B1* | 12/2007 | Cheriton | ................ | H04L 49/30 370/220 |
| 11,005,814 B2* | 5/2021 | Curcio | ............... | H04L 63/0263 |
| 2003/0202513 A1* | 10/2003 | Chen | ...................... | H04L 45/16 370/390 |
| 2007/0022211 A1* | 1/2007 | Shimizu | ............. | H04L 63/0236 709/238 |
| 2007/0047548 A1* | 3/2007 | Yazaki | ............... | H04L 63/1458 370/392 |

(Continued)

*Primary Examiner* — Ramy M Osman
(74) *Attorney, Agent, or Firm* — Foley & Lardner LLP

(57) ABSTRACT

A programmable switching device within a network infrastructure that includes at least one port; and at least one programmable filter communicatively coupled to the at least one port, wherein the at least one programmable filter is configured to permit/deny data packets being transmitted to or from a networked device connected to the at least one port based on a set of defined rules.

20 Claims, 9 Drawing Sheets

(56) References Cited

U.S. PATENT DOCUMENTS

| | | | |
|---|---|---|---|
| 2008/0080543 A1* | 4/2008 | Hickox | H04L 49/65 |
| | | | 370/419 |
| 2008/0189769 A1* | 8/2008 | Casado | H04L 63/102 |
| | | | 726/4 |
| 2010/0064032 A1* | 3/2010 | Vinel | H04L 41/0806 |
| | | | 709/228 |
| 2012/0117228 A1* | 5/2012 | Gabriel | H04L 47/00 |
| | | | 709/224 |
| 2014/0233385 A1* | 8/2014 | Beliveau | H04L 47/122 |
| | | | 370/235 |
| 2020/0322313 A1* | 10/2020 | Huang | H04L 45/74 |
| 2021/0176125 A1* | 6/2021 | Kyriannis | H04L 41/0813 |

* cited by examiner

60

Flow Policy Template (FPT ID = Hash on NodeID): Switch 1 Port 2 Inbound
Blue Flow Policy Segment (FPS ID = 32-bit ID)

| Source | Protocol | SrcPort | Destination | DstPort | Flags | Action |
|---|---|---|---|---|---|---|
| 10.1.0.2 | TCP | Dynamic | 10.1.0.3 | 443 | | Permit |
| 10.1.0.2 | TCP | Dynamic | 10.1.0.4 | 443 | | Permit |
| 10.1.0.2 | TCP | Dynamic | 10.1.0.7 | 443 | | Permit |
| 10.1.0.2 | TCP | Dynamic | 10.1.0.8 | 443 | | Permit |
| Any | Any | Any | Any | Any | | Deny |

61

Flow Policy Template (FPT ID = Hash on NodeID): Switch 1 Port 2 Outbound
Blue Flow Policy Segment (FPS ID = 32-bit ID)

| Source | Protocol | SrcPort | Destination | DstPort | Flags | Action |
|---|---|---|---|---|---|---|
| 10.1.0.3 | TCP | 443 | 10.1.0.2 | Dynamic | Established | Permit |
| 10.1.0.4 | TCP | 443 | 10.1.0.2 | Dynamic | Established | Permit |
| 10.1.0.7 | TCP | 443 | 10.1.0.2 | Dynamic | Established | Permit |
| 10.1.0.8 | TCP | 443 | 10.1.0.2 | Dynamic | Established | Permit |
| Any | Any | Any | Any | Any | | Deny |

62

Flow Policy Template (FPT ID = Hash on NodeID): Switch 1 Port 5 Inbound
Yellow Flow Policy Segment (FPS ID = 32-bit ID)

| Source | Protocol | SrcPort | Destination | DstPort | Flags | Action |
|---|---|---|---|---|---|---|
| 10.1.0.5 | TCP | Any | 10.1.0.6 | Any | | Permit |
| Any | Any | Any | Any | Any | | Deny |

63

Flow Policy Template (FPT ID = Hash on NodeID): Switch 1 Port 5 Outbound
Yellow Flow Policy Segment (FPS ID = 32-bit ID)

| Source | Protocol | SrcPort | Destination | DstPort | Flags | Action |
|---|---|---|---|---|---|---|
| 10.1.0.6 | TCP | Any | 10.1.0.5 | Dynamic | Established | Permit |
| Any | Any | Any | Any | Any | | Deny |

To FIG. 2 (CONT'D) Via The Controller

FIG. 2

PROGRAMMABLE SWITCHING DEVICE FOR NETWORK INFRASTRUCTURES

PRIORITY

This Continuation application claims the benefit or priority to U.S. Non-Provisional patent application Ser. No. 16/709,444, filed on Dec. 10, 2019, which is hereby incorporated by reference herein in its entirety.

BACKGROUND

A network is an interconnected group of computer systems linked by the various infrastructure elements of a data or telecommunications architecture. Specifically, this infrastructure refers to the organization of its various parts and their configuration—from individual networked computers to routers, cables, wireless access points, switches, backbones, network protocols, and network access methodologies. Infrastructures can be either open or closed, such as the open architecture of the Internet or the closed architecture of a private intranet. They can operate over wired or wireless network connections or a combination of both.

The simplest form of network infrastructure typically includes one or more computers, a network or Internet connection, and a switch to link the computers to the network connection and tie the various systems to each other. The switch merely links the computers but does not limit data flow to or from any one system. A router can be used to interlink networks and provide a common language for data exchange according to the rules of each network. A router can control or limit access between networks and regulate data flow.

Office intranets are similar to the global Internet but operate on a closed network infrastructure accessible only to those within it. Office intranet systems generally consist of a central data storage unit, which can include one or more computers known as servers, as well as Ethernet network cabling, wireless access points, routers, switches, and the individual computers with access to the central data storage unit. The individual computers can connect to the network via either cabling or wireless access. The routers and switches then can determine what level of access each individual computer can have and act as traffic directors to point the individual computers to the central data storage unit on the servers. As the individual computers send or receive data, the routers and switches operate in concert to ensure the data reaches the appropriate place.

Network security is often a primary concern when building a network infrastructure. Firewalls are part of a computer system or network which is designed to block unauthorized inward access while permitting outward communication. Most architectures use dedicated firewalls or routers with built-in firewalls, as well as software, that control user access, conduct data packet monitoring, and restrict access to defined protocols and network services. Security can also be controlled by adjusting network sharing properties on individual systems that limit the folders and files that can be seen by other users on the network.

The entire network infrastructure is interconnected and can be used for internal communications, external communications or both. A typical network infrastructure includes: Networking Hardware (e.g., Routers, Switches, Hardware-based Firewalls, LAN cards, Wireless routers, Cables, etc.), Networking Software (e.g., Network operations and management, Operating systems, Software-based Firewalls, Network security applications, etc.) and Network Services (e.g., Communications links, Internet, Satellite, Wireless protocols, IP addressing, etc.)

Layer 1 of a network infrastructure defines the electrical, mechanical, procedural, and functional specifications for activating, maintaining, and deactivating the physical link between end systems. Some common examples are Ethernet segments and commercial links like SONET, optical, and broadband. These Layer 1 network devices transfer data, but these devices do not manage any of the traffic flowing through it, e.g., an Ethernet optical transceiver. In other words, any packet entering a port is delivered to the output port without any additional processing.

Layer 2 defines how data is formatted for transmission and how access to the physical media is controlled. Layer 2 network devices can provide an interface between the networked device and the physical media, e.g., a Network Interface Controller (NIC) installed on a host, router, or switch. A layer 2 network device can be a multiport device that use hardware addresses, e.g. a MAC address, to process and forward data at the data link layer (layer 2). A switch operating as a layer 2 network device may interconnect devices in a home or office, buffer incoming packets and adjust transmission speeds.

Local Area Network switching is a form of packet switching used in data networks. LAN switching technologies are crucial to network design as they allow traffic to be sent only to its intended destination, rather than sending the traffic to all hosts on a network. LAN switching can use different kinds of network switches and the interconnect between switches may be regulated using, e.g., spanning tree protocols (STP).

In use, computers and other networked devices can be interconnected via wired or wireless connections through a network switch. These switches can be subdivided into smaller, separate switches to create Virtual LANs (VLANs). Conventional switches do not impose security controls on the network communications between networked devices on the same VLAN. In other words, all devices on a LAN can freely communicate with one another.

Layer 3 provides connectivity and path selection between two host systems using protocols that can span geographically separated networks. In the case of a host, this is the linkage between the data link layer (layer 2), the upper layers of the network operating system (NOS), and the corresponding layers on a host being communicated with. A router establishes the Layer 3 link between LANs (Layer 2) using protocols such as IP (Internet Protocol).

Layer 3 switches typically support IP routing between VLANs configured on the switch. Some layer 3 switches support routing protocols which routers use to exchange information between networks. Overall, as a router can interconnect multiple LANs, operating at Layer 3, this enables scaling the size of a network beyond the—250 networked devices allowed per LAN. Routers can also interconnect LANs with WANs (Wide Area Networks), e.g. long-distance building links, connections to Cloud Services, and the Internet.

A router's primary function is to direct traffic between various networks (LANs, WANs, etc.). Routers typically possess some basic network filter capabilities to control traffic between networks but cannot filter traffic within its network.

A firewall interconnects networks, operating at Layer 3 (network addresses), Layer 4 (network connections), and the upper layers (applications). A firewall's primary function is to inspect or control (e.g., permit/deny) traffic between networks. A firewall cannot filter traffic within a network.

SUMMARY OF THE INVENTION

The disclosed technology is a programmable switching device that includes individual programmable ports. These individual programmable ports enforce security controls at each individual switch port. These individual programmable ports filter incoming and outgoing data to deny any unauthorized access into or out of any networked devices on a network. In other words, the programmable switching device of the disclosed technology enables control of network traffic into, out of, and within a LAN (or VLAN) and can protect every networked device from every other networked device within its network, while allowing intended networked devices to privately communicate with one another on a LAN (or VLAN). The programmable switching device can thereby create true network isolation on an open LAN.

The programmable switching device of the disclosed technology can be used with a network controller that permits a network to have features, such as, automated operation, learning of behavioral network traffic patterns, and application of security controls via a whitelisting model through, e.g., Software Designed Networking (SDN) technology. It can also have SDN capabilities that enable dynamic programming of the programmable switching device in real-time in response to security threats and autonomously react to unauthorized activity.

The SDN-enabled infrastructure further offers active secure programming interfaces which enable a network controller to query the infrastructure in real-time for its operating parameters and send programming to the programmable switching devices to dynamically alter their ports operation in response to new conditions. Network controllers can also govern the operation of a network at a scale and speed otherwise not possible with traditional networks as well as using external data sources (external databases, telemetry data, etc.) that were not otherwise available for processing by conventional network devices.

The programmable switching device of the disclosed technology allows the network to also have unique software features, e.g., automated network flow discovery, LAN device recognition, a flow approval and authorization process, security controls, logic to safeguard LAN devices, automated detection of unauthorized outbound flows, automatic programming of the programmable switching device based on desired security controls, and device federation and virtualization, to name a few.

In one implementation, a programmable switching device can comprise at least one port and at least one programmable filter communicatively coupled to the at least one port, wherein the at least one programmable filter is configured to permit/deny data packets being transmitted to or from a networked device connected to the at least one port based on a set of defined rules.

In some implementations, a controller can transmit the set of defined rules to the at least one programmable filter. In some implementations, the controller can be a network device communicatively coupled to the programmable switching device. In some implementations, the controller can be an SDN-enabled device secured by a firewall. In some implementations, the controller can be an application running on a secured computer. In some implementations, an application programming interface can link the controller to the programmable switching device.

In some implementations, the controller can be embedded within the programmable switching device and transmit the set of defined rules to the at least one programmable filter. In some implementations, this embedded controller can govern two or more programmable switching devices via an Application Programming Interface (API).

In some implementations, a reporting module can be configured to transmit telemetry such as network, host, or data flow characteristics to the controller. In some implementations, the controller can analyze the telemetry and automatically update the set of defined rules based on the analyses.

In some implementations, the set of defined rules is configured by a network administrator. In some implementations, the set of defined rules is configured by machine learning or Artificial Intelligence (AI) techniques. In some implementations, the set of defined rules is configured by automation.

In some implementations, an identification module can provide identification protocols for the programmable switching device and the network.

In some implementations, a data packaging module can be configured to receive and transmit data from the programmable switching device. In some implementations, the at least one port can be a wired connection point. In some implementations, the at least one port can be a wireless connection point. In some implementations, the at least one port can be another type of networked port, e.g. a serial interface.

In another implementation, a network infrastructure can comprise at least two programmable switching devices, the at least two programmable switching devices each having at least two ports with each port being communicatively coupled to at least one programmable filter; and a controller, the controller being communicatively coupled to the at least two programmable switching devices, wherein the controller populates the at least one programmable filter communicatively coupled to each port of the at least two programmable switching devices with a set of defined rules.

In some implementations, the set of defined rules can permit/deny data packets from being transmitted to or from a networked device, the networked device being communicatively coupled to one of the at least two ports of the at least two programmable switching devices. In some implementations, the set of defined rules can be configured by a network administrator. In some implementations, the set of defined rules can be configured by machine learning or Artificial Intelligence (AI) techniques. In some implementations, the set of defined rules can be configured by automation.

In some implementations, a reporting module can be configured to transmit telemetry such as network, host, or data flow characteristics to the controller. In some implementations, the controller can analyze the telemetry and automatically update the set of defined rules based on the analyses.

DETAILED DESCRIPTION

Figure 1:
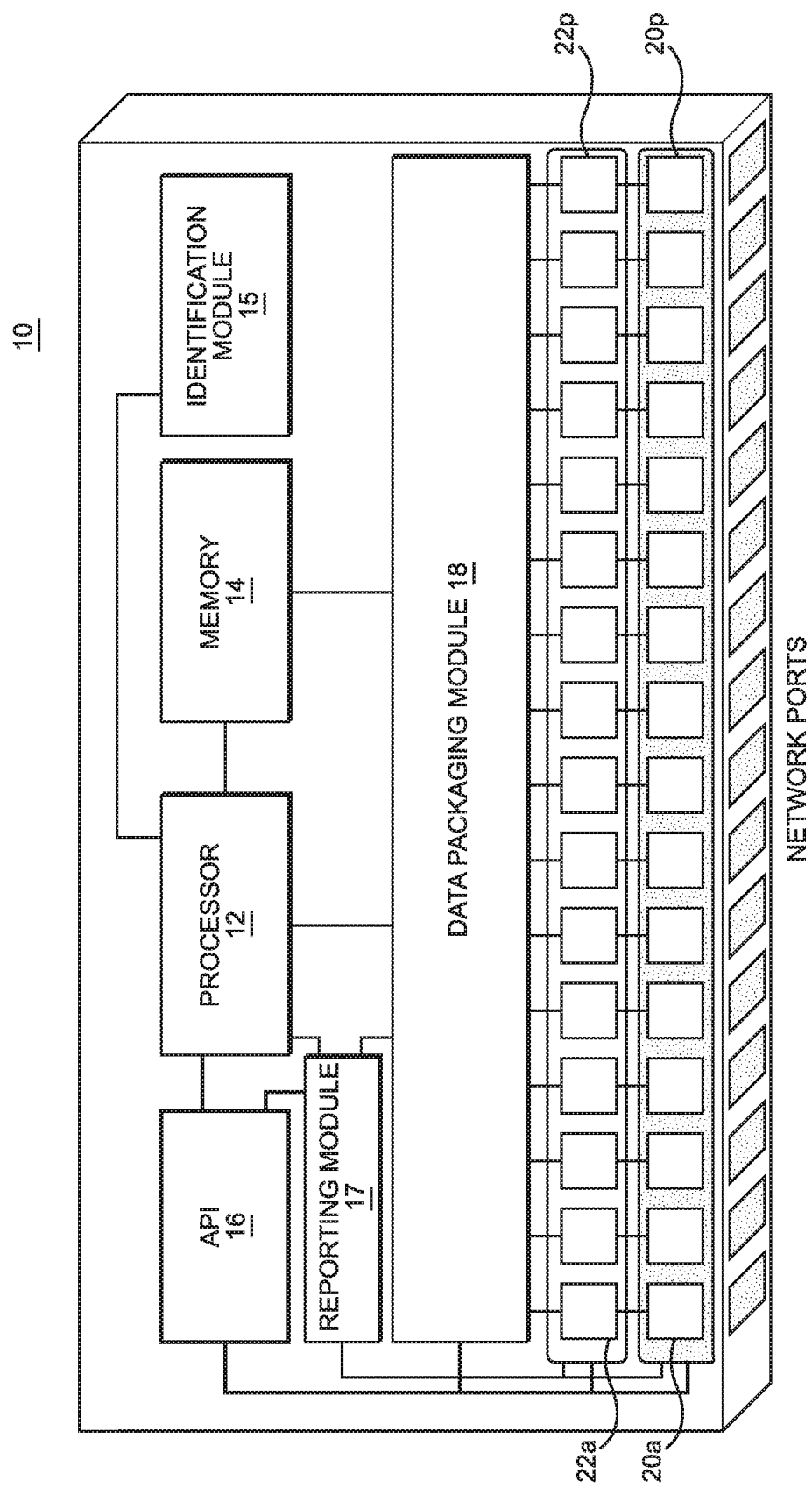
FIG. 1 is a block diagram of a programmable switching device of the disclosed technology.

Office intranets are similar to the global Internet but operate on a closed network infrastructure accessible only to those within it. Operational Technology (OT) and Internet of Things (IoT) devices run on these intranets and exist in huge quantities within a building's physical infrastructure. These devices, however, are poorly secured, rarely updated for security flaws, require network and Internet access to function, and represent a massive security target for systems, such as but not limited to Building Management Systems, Physical Security Systems, Audiovisual Systems, etc.

Hackers target these devices to inject malicious software into a network which can e.g. modify a building's safety features, thereby creating life safety risks, target a company's server to capture sensitive data, or use the company's network as a launching point for additional attacks.

Conventional network security mostly relies upon firewalls to act as a boundary between insecure ("outside") networks (i.e., The Internet) and secure ("inside") networks. In these secure networks, network traffic flows travel in a direction often referred to as "North-South" when North-bound flows head towards the outside, e.g., the Internet. In contrast, flows within or across an internal network travel "East-West."

Firewalls used with these conventional networks filter flows via security policy "rules" installed by an administrator. These rules are represented in a human-readable form often recognized as Access Control Lists, which specify the filter attributes and the action taken when a packet is matched against the attributes. In use, firewalls operate in a "stateful" manner to control which flows enter a secure network. The firewall can allow an incoming "South-bound" flow from an outside client to access an "Internet-facing" server (e.g., a company's website) on the company's secure network. The firewall can also allow South-bound flows into the secure network which are in response to connections initiated from within the network (e.g., a desktop computer accessing a website or video service). These "stateful" firewalls can track every "North-bound" flow leaving the secure network in order to only allow the response to return. However, there is typically less or even no control on North-bound flows to restrict which communications may exit a network. In simple terms, modern firewalls act as a moat around a fortress, providing a boundary at the perimeter ("Edge") of a network; the rules are the gatekeeper at the fortress gate, screening individuals for who may enter.

Multiple firewalls can be installed on these conventional secure networks, creating multiple boundaries for a hacker to overcome. For example, firewalls can be placed at the Internet Edge, Data Center Edge, WAN (Wide Area Network) Edge, etc. Modern servers typically run firewalls within their operating systems as well. Coordination between various firewalls of different manufacturers and types is very difficult. This type of patchwork system can create holes in the overall network security posture which leads to network and system vulnerability.

Problem Case A

The creation of reliable firewall rules and their ongoing management is a significant challenge, amplified by the sheer number of rules configured in modern firewalls securing enterprise networks, which can number in the tens of thousands of rules or more. The sequencing of firewall rules and proper insertion of a new rule positionally within the overall sequence can have an impact on other rules (and the security posture of the network), and also has bearing on the efficacy of the new rule being inserted. Creation of firewall rules within this type of system is thus tedious and error-prone, conducted by individuals attempting to place controls on the communications of applications and systems which aren't fully understood. Further, a conventional "Blacklisting" approach to firewall rules is often a subjective list created by what an administrator believes to be malicious or unwanted activity into the secure network and by default allows all other communications to enter. This is analogous to the gatekeeper allowing everyone into the fortress except for individuals believed to be bad. This approach is very risky as failing to block even one malicious flow can let the hacker into the secure network. "Blacklisting" was the norm when security issues were less prevalent on the Internet, and this technique has been perpetuated over the years as network administrators were unwilling to disrupt these fragile sequences of complex firewall rules which were not necessarily well understood across generations of network operations staff A "Whitelisting" approach is considered a "best practice" but is less common for the reasons described above. This approach allows only the desired incoming communications to enter the secure network and by default blocks all other communications. This is analogous to the gatekeeper allowing no one to enter the fortress unless they explicitly meet the criteria for entry. This approach is much more secure: a key benefit is that a failure to account for a flow results in its denial of access into the secure network.

This Whitelisting approach can also be challenging to develop and maintain as it requires a detailed understanding of all applications and systems on the network. For example, some rules will remain in a firewall forever as administrators are fearful of removing old rules that can impact production services as there is no tolerance for disruption of technology that may affect the operation of a business. This allows holes to develop as applications are retired and new systems reuse old network addresses with different security needs.

Problem Case B

As discussed above, firewalls can operate at the Network Edge. Once a hacker has entered the secure network, there is substantial freedom to move laterally ("East-West") across the network to compromise other systems and applications. Once systems are compromised, networks fail to restrict flows which leave the network and exfiltrate sensitive data or are used to conduct attacks against other networks. The prevalence of companies losing credit card, SSN, medical, or other PII (Personally Identifying Information) data, corporate assets and other confidential information is a testament to this major vulnerability. Hackers use compromised systems to leapfrog through multiple networks to obscure their location. Using vulnerabilities within compromised systems, hackers use the systems own software to attack other networks. Hackers can masquerade their outbound flows as web clients and encrypt their communications. It is very difficult to decipher which outbound flows are legitimate and subsequently control them.

With the proliferation of Cloud-based services, it's nearly impossible to know which Internet (IP) address destinations are legitimate. Hackers also locate their bases of operation in the same Cloud services, making them very difficult to detect. The volume and complexity of outbound flows is overwhelming as there are often far more legitimate flows initiated outbound than inbound. Compounding the issue, incoming flows are better documented by manufacturers than the outbound flows of an application or device. As a result, malicious outbound flows can easily be overlooked amidst the outpouring of legitimate outbound flows.

For example, some networked products increasingly rely on outbound flows and Internet access in order to "phone home" to their manufacturers for support and integrate with a greater ecosystem of Cloud-based technologies and services (i.e., Flat-Screen TVs contacting its manufacturer for software updates, usage data and statistics; the apps on the TV accessing YouTube, Netflix, etc.) In some instances, even the "phone home" capability may be undesirable, as it can divulge sensitive data or the behavioral information of individuals.

Problem Case C

Understanding and controlling the network use of desktop computers and laptops is well understood and can be managed. Mobile and IoT devices, however, don't have the diagnostic interfaces and support needed to understand and control their activity within a network. For example, Operational Technology (OT) (and collectively The Internet of Things (IoT)) is highly susceptible to both North-South as well as East-West based attacks and given their lack of adequate instrumentation are very difficult to secure.

For background, OT can provide critical support for facility operations and security, e.g., lighting, HVAC, electrical plants/generators, surveillance cameras, security access, conference room systems and displays, elevators, printing devices, laundry systems, vending machines, Point of Sale systems, vehicles, aircraft, and more. Historically these devices were hard wired to control systems but linking OT devices to a network is more cost effective, enables greater integration across technologies, and provides "phone home" support with its manufacturer.

Many large manufacturers, however, with decades of OT product development, are not fluent in network technology and security. Security is often viewed by these manufacturers as a problem for network administrators to solve, with little security built into the OT devices themselves. For example, OT technologies typically do not support basic Enterprise-grade security technologies, such as the authentication of individual devices for admission onto the network (i.e., the 802.1x protocol, WPA2 Enterprise, certificate-based authentication, etc.). There is also little to no support for network-based diagnostics and understanding the real-time behavior of OT devices on the network. Further, "phone home" capability by OT devices is often mandated by expensive support contracts, forcing IT departments to provide OT devices with Internet access.

Furthermore, ongoing development of software and security updates for OT systems is often limited as manufacturers move onto the next R&D project, requiring customers upgrade to obtain new features. The burden of purchasing new products to address security flaws perpetuates legacy critical technology with vulnerabilities on the network for years. Everyday technologies such as flat screen TVs and home routers are susceptible as well as they are out of date within 1-2 years with no further software or security updates provided. Many thousands of these devices exist on large networks, often differing in vintage, software version, configuration, and security posture. OT is a considerable security target given the relative ease with which they can be compromised and the negative impact that the "hack" can have on a company.

To overcome the above problems, a programmable switching device was developed that includes a set of ports that are individually programmable, yet coordinated as a unified, coherent system. Now each port within a network can be protected with its own individual access rules, while coordinating these rules across the entire network holistically to establish a security-based segmentation model or a security-based isolation model using an access rule paradigm. This programmable switching device can be further coupled with SDN and automation thereby making any unauthorized access into or out of any networked device nearly impossible.

As shown in FIG. 1, the programmable switching device 10 of the disclosed technology can include a processor 12, a memory 14, an identification module 15, an application programming interface (API) 16, a reporting module 17, a data packaging module 18, I/O network ports 20a-p and programmable filters 22a-p.

The I/O network ports 20a-p can be any type of conventional I/O ports 20a-p that allows any type of networked device (routers, switches, computers, IoT devices, etc.) to be connected to the programmable switching device 10 so that data can be passed into, out of and within a network infrastructure. The I/O network ports 20a-p can be configured to operate in various modes, e.g., open, learning, approval, restrictive, and stateful (which may require stateful firewalling mechanisms within the programmable switching device).

Each I/O network port (ports 20a-p) can be communicatively coupled to its own individual programmable filter 22a-p. The programmable filters 22a-p can be set via a network controller (described more fully below) using a set of defined rules that can control a networked device's interactions within the network. The set of defined rules can be set by a network administrator, by machine learning or Artificial Intelligence (AI) techniques, by automation or by any other conventional method. In some implementations, these rules can be represented in human-readable form as Access Control Lists (ACLs).

In one implementation, the set of defined rules can be defined using one or more of the following: (1) Flow Policy Templates (FPT) which are sets of access rules controlling a networked device's use of the network, (2) Flow Policy Segments (FPS) which are sets of FPTs controlling the scope of access for a set of networked devices on the network and (3) Flow Policy Groups which are sets of networked devices whose IP connections have FPTs within an FPS, i.e. sets of networked devices which share IP connections within the same FPS. Other types of defined rules templates are contemplated.

In some implementations, the set of defined rules can be stored on the memory 14 and implemented with the processor 12 of the programmable switching device 10 so the programmable filters 22a-p can access the memory and processor, as needed. In other implementations, the programmable filters 22a-p can have their own data storage, processing, logging or statistics capabilities.

In some implementations, the programmable switching device 10 can include an API 16. The API 16 can be any type of interface or communication protocol that links the programmable switching device 10 and the controller 50 so that the controller 50 can transmit the set of defined rules to the programmable switching device 10 for each individual programmable filter 22a-p, collect reporting data, and otherwise manage and operate the programmable switching device.

As hosts and their data flows are granted access to the network, the data packaging module 18 with the use of the processor 12 and memory 14 can package and transmit the data as requested from a networked device. In some implementations, the data packaging module can operate autonomously, independent of the processor, and is programmed directly via the API. Additionally, as data enters the programmable switching device from the network, the data packaging module 18 with the use of the processor 12 and memory 14 can receive and hold the data until access is given to allow the data to be transmitted to the networked device. In other words, as the switch receives data, there is a temporary stopping of the data flow within the switch. Once the flow is approved, the data flow is allowed to flow to the desired networked device.

The programmable switching device 10 can also collect data flow characteristics from the data that passes through the programmable switching device 10 using the reporting module 17. These data flow characteristics can then be forwarded to the controller 50 via the API module 16 so an analysis can be performed on the data flow characteristics, e.g., accessing real-time threats and learning what type of data flows are typical for a given port, or identifying anomalous network behavior. For example, a log of the analysis attributes and results can be generated and optionally recorded within the programmable switching device and/or sent to the controller. Statistical information such as match/non-match counts can be recorded as well.

The programmable switching device 10 can also include an identification module 15. The identification module 15 can include a unique ID for the programmable switching device 10. In use, the controller 50 (shown in FIG. 2) will be given the unique ID before any programmable switching device 10 is connected to the network. If a programmable switching device is connected to the network but the device has an ID that is not recognized by the controller 50, that newly connected switching device will not be able to connect to the network and an alert can be issued. This identification mechanism can be protected with a secure process, such as e.g. a cryptographic and/or key-based mechanism.

Figure 2:
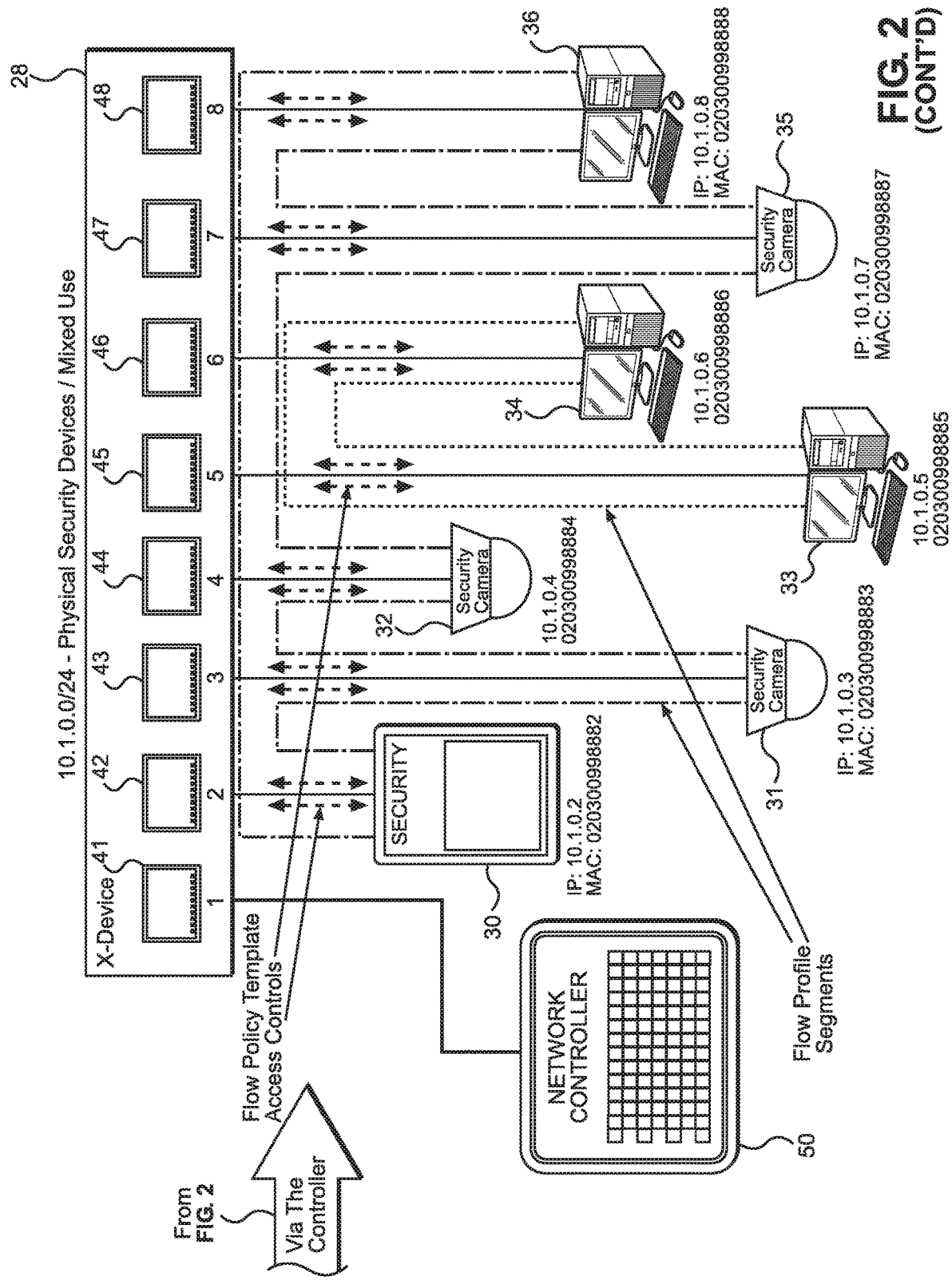
FIG. 2 is an illustrative example of the programmable switching device of the disclosed technology.

In FIG. 2, the programmable switching device 28 includes I/O network port 41-48. In this implementation, eight ports are used but any number of ports can be utilized, e.g., large switching devices can be configured with hundreds of ports. Each of these I/O network ports 41-48 can be communicatively coupled to individual networked devices 30-36, (e.g., Port 41 is connected to a controller, Port 42 is connected to a security device 30, Ports 43, 44, 47 are connected to security cameras 31, 32, 35 and Ports 45, 46 and 48 are connected to computers 33, 34, 36).

The programmable filters 22a-p associated with each port 41-48 can be programmed from the controller 50. In some implementations, the controller 50 can be an external or stand-alone controller. In other implementations, the controller can be embedded on the programmable switching device, described more fully below.

In some implementations, the controller 50 can be, e.g., any type of SDN-enabled controller (other types of controllers are contemplated). The SDN-enabled controller can be connected to the network and be protected via a firewall or may have a dedicated line into the programmable switching devices. The SDN-enabled controller 50 and programmable switching device 28 communicate via active, secure programming interfaces which enable the controller 50 to interact with the network infrastructure in real time or near real time for its operating parameters and send rule changes to the programmable switching devices, thereby dynamically altering their operation in response to new conditions, e.g., a malware attack. This allows the controller 50 to govern the operation of a network at a scale and speed otherwise not possible with traditional networks. In some implementations, external data sources, e.g., external databases, telemetry data, etc., not available for conventional networks can be implemented on the disclosed network.

As shown in FIG. 2, networked devices 30-36 can be associated with FPT rules 60-63 set via the controller 50. For example, security device 30 can be granted access to transmit data to cameras 31, 32, 35 and management station 36 (FPT rule 60), management station 36, and cameras 31, 32, 35 can be granted access to transmit data to the security device 30 (FPT rule 61), desktop computer 33 can transmit to desktop computer 34 (FPT rule 62) and desktop computer 34 can transmit to desktop computer 33 (FPT rule 63). (Please note, additional rules and variations thereof can be applied to each port's filters for inbound and outbound controls.)

Figure 3:
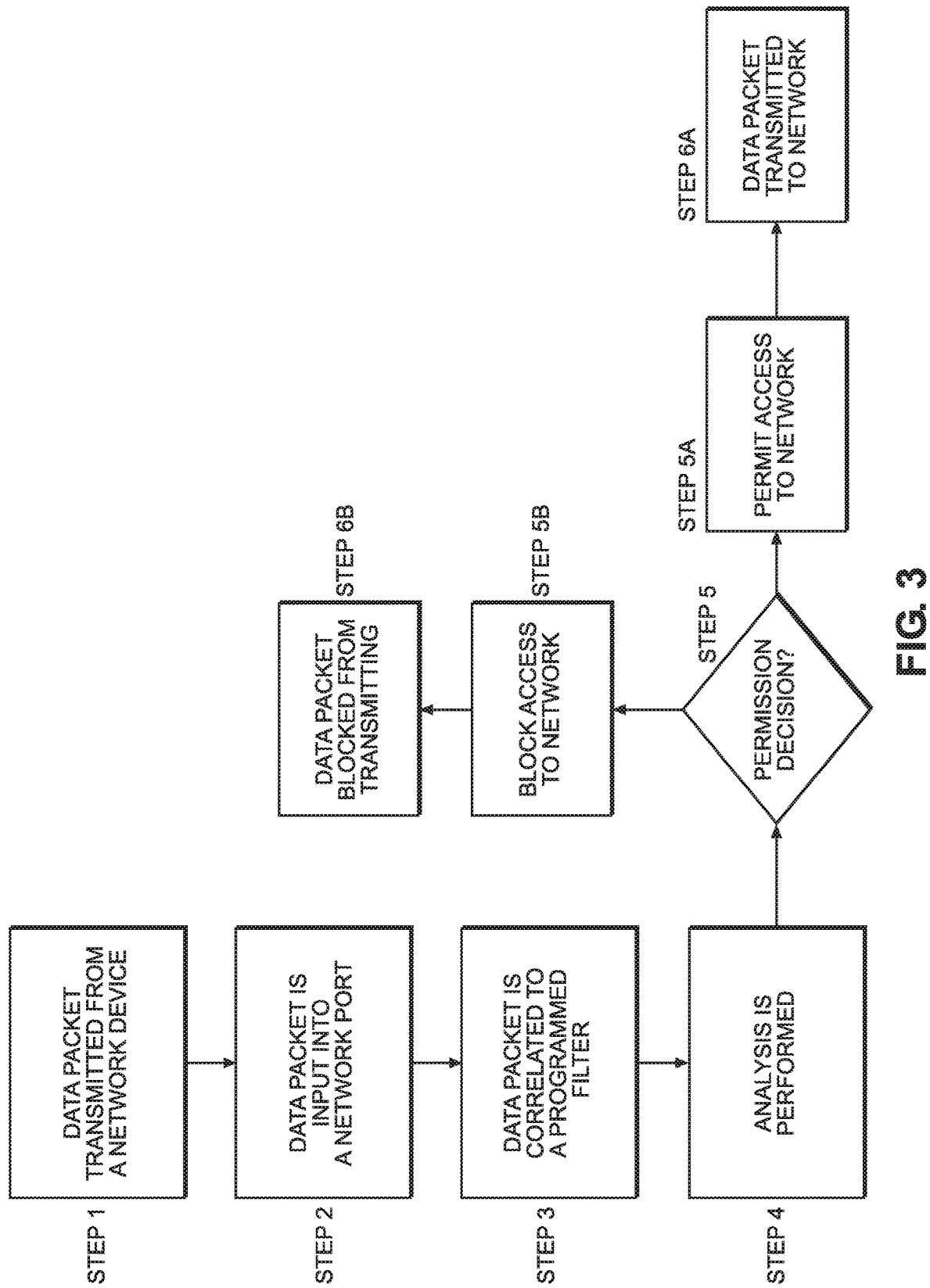
FIG. 3 is a flow chart describing a data packet being transmitted from a networked device to a network using the programmable switching device of the disclosed technology.

FIG. 3 is a flow diagram showing how a data packet received from a protected networked device is admitted. In Step 1, the data packet is transmitted from a protected networked device. In Step 2, the data packet is input into the network port of the programmable switching device. The data packet is then correlated to the programmable filter associated with the networked device, Step 3. An analysis is performed on the data packet using the FPT rules associated with that network port filter, Step 4. A decision is made regarding packet transmission, Step 5. If the packet falls within the parameters of the FPT rules, the data packet is permitted to access the network, Step 5a. The packet is then transmitted to the network, Step 6a. If the packet does not fall within the parameters of the FPT rules, the data packet is denied access to the network, Step 5b. The packet is blocked from transmitting, Step 6b.

Figure 4:
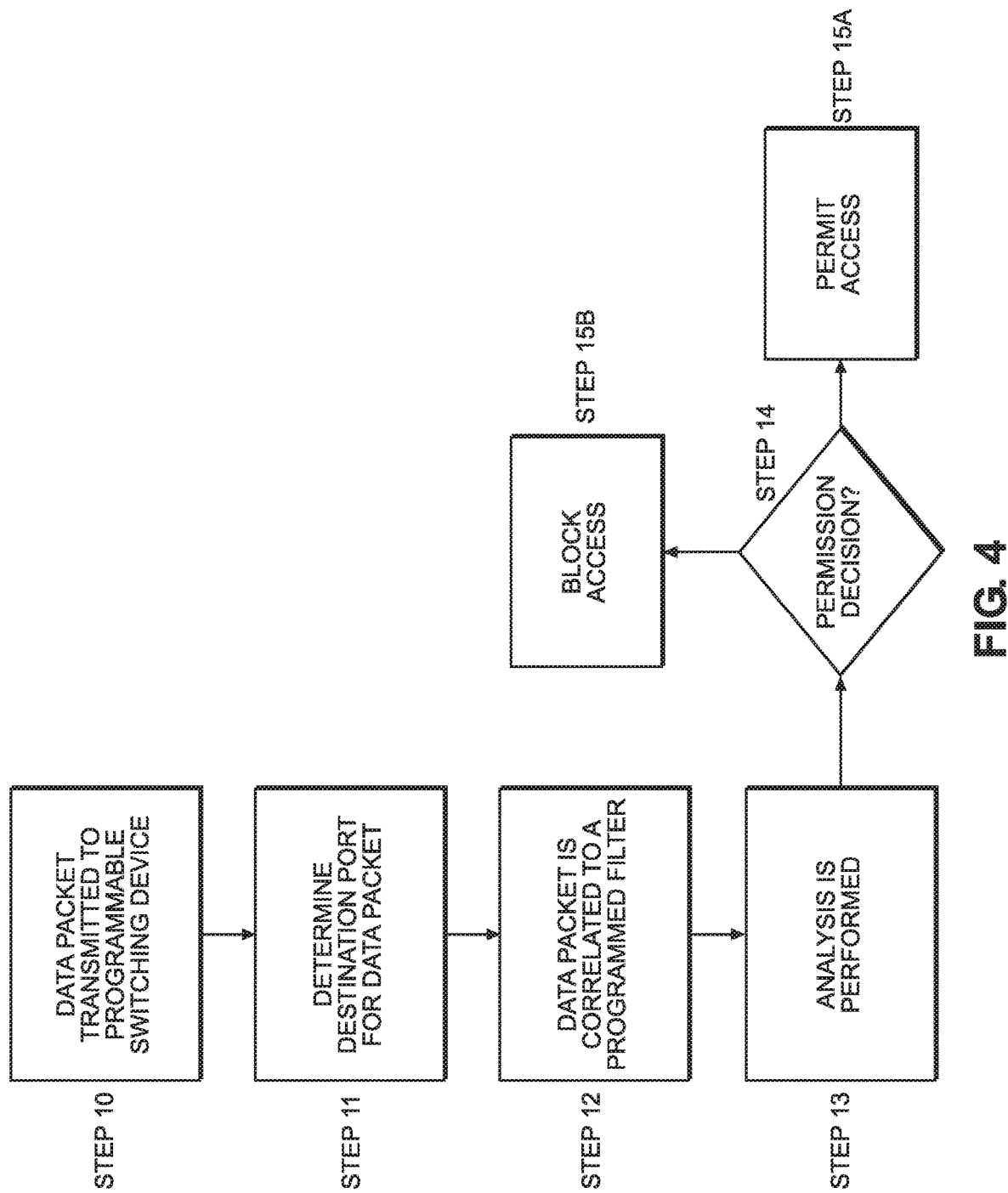
FIG. 4 is a flow chart describing a data packet being transmitted from a network to a networked device using the programmable switching device of the disclosed technology.

FIG. 4 is a flow diagram showing how a data packet received from an outside source is admitted. In Step 10, the data packet is transmitted to the programmable switching device. In Step 11, a determination is made as to which network port the data packet is headed. The data packet is correlated to the programmable filter associated with the determined network port Step 12. An analysis is performed on the data packet using the FPT rules associated with that network port filter, Step 13. A decision is made regarding packet transmission. (Step 14). If the packet falls within the parameters of the FPT rules, the data packet is permitted to be transmitted to the destination networked device, Step 15a. If the packet does not fall within the parameters of the FPT rules, the data packet is denied access to the destination networked device Step 15b.

Figure 5:
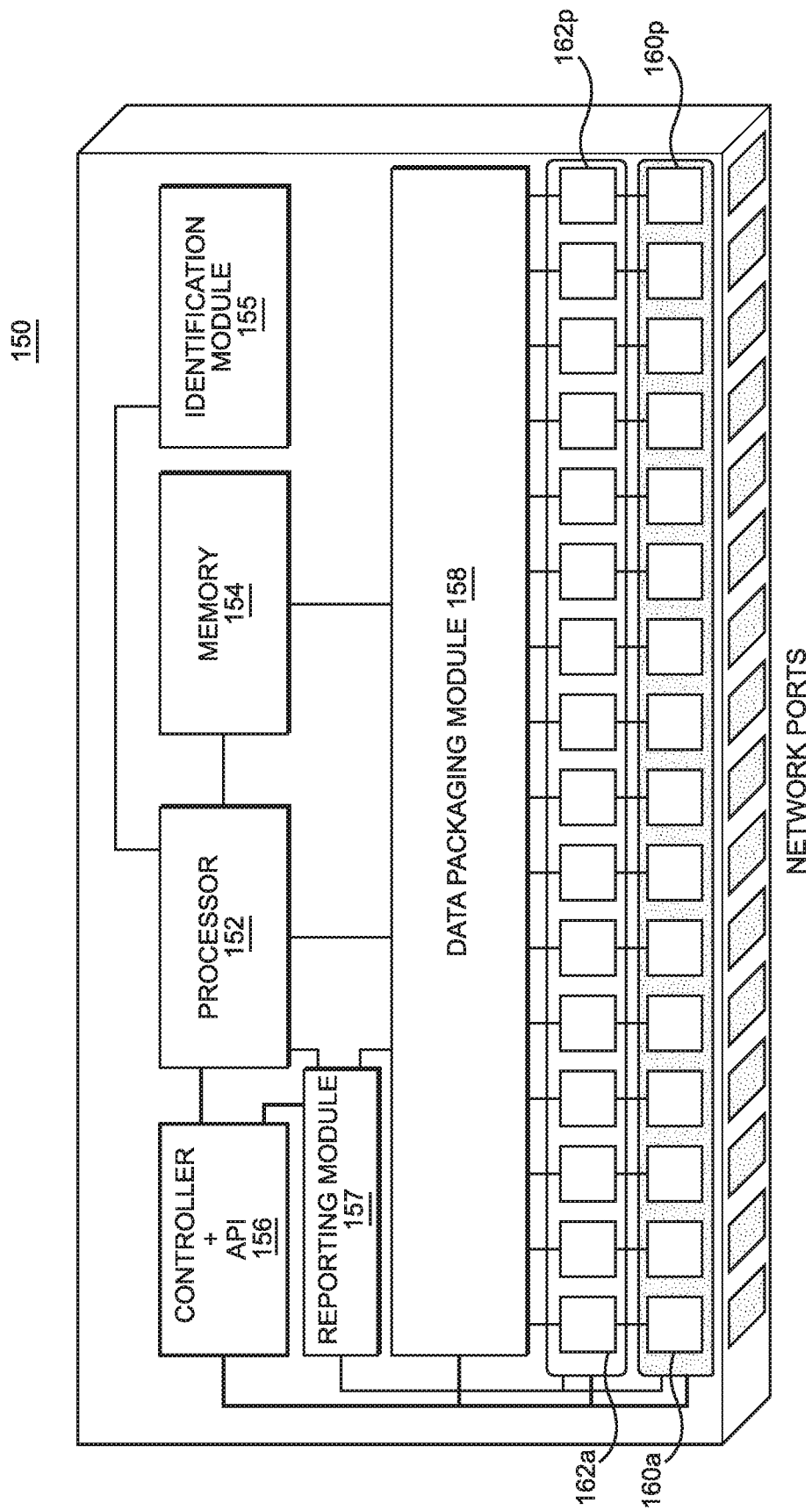
FIG. 5 is a block diagram of an implementation of the programmable switching device of the disclosed technology with an embedded controller.

As shown in FIG. 5, the programmable switching device 150 can include an embedded controller. The programmable switching device 150 can include a processor 152, a memory 154, identification module 155, a controller 156, a reporting module 157, a data packaging module 158, I/O network ports 160a-p and programmable filters with logging and statistics capability 162a-p. The programmable switching device 150 with embedded controller 156 functions in a similar fashion to the programmable switching device 10 where the received and transmitted data packets are subject to FPT rules as described above. In some implementations the embedded controller can govern one or more programmable switching devices via their API.

The embedded controller 156 can be accessed with, e.g., a web interface or a physical networked device running a virtual controlling application for setting the defined rules and managing the programmable switching device.

Figure 6:
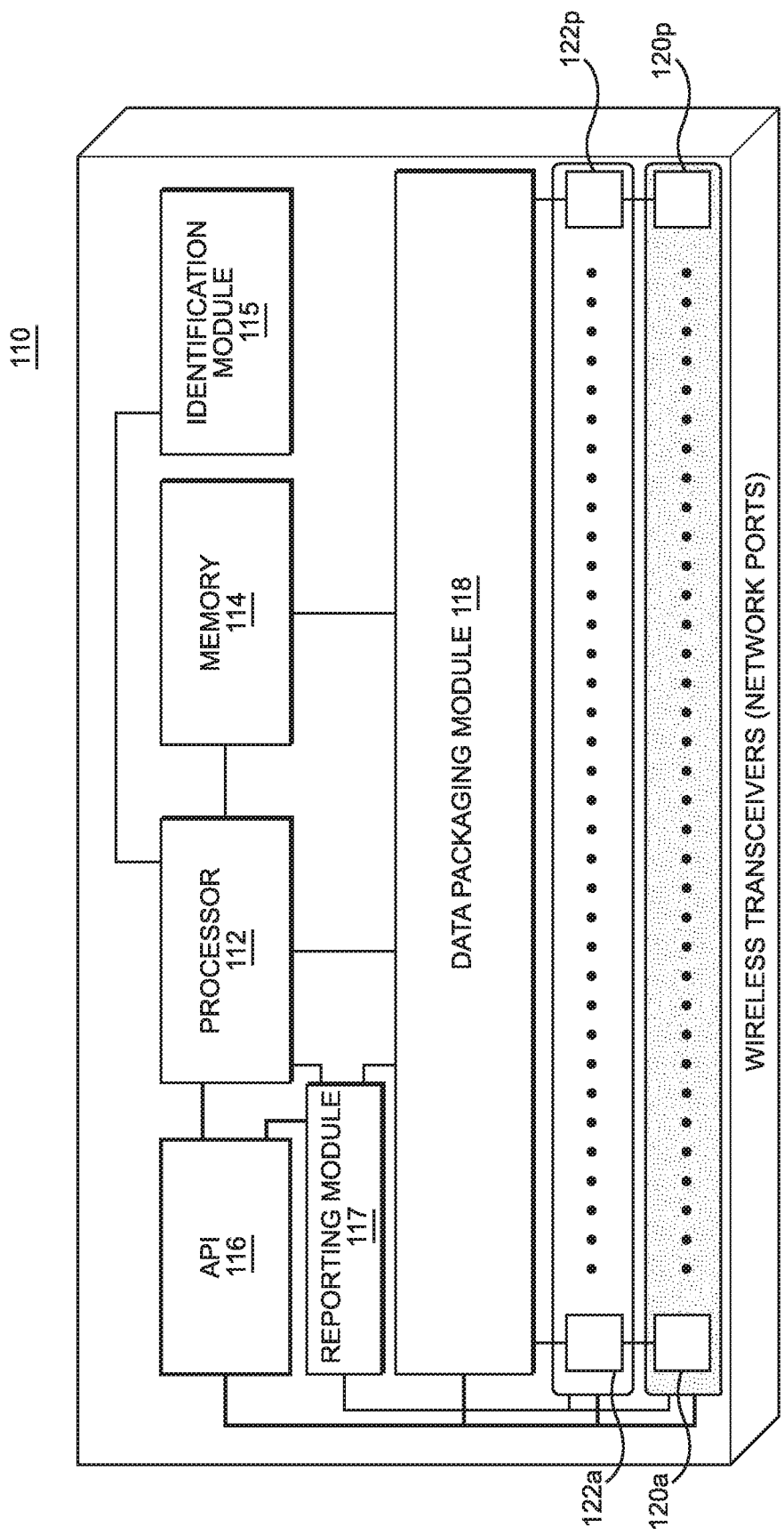
FIG. 6 is a block diagram of wireless implementation of the programmable switching device of the disclosed technology.

FIG. 6 shows an implementation of a wireless programmable switching device 110 of the disclosed technology. The wireless programmable switching device 110 can include a processor 112, a memory 114, identification module 115, an API 116, a reporting module 117, a data packaging module 118, I/O network ports 120*a-b* and programmable filters with logging and statistics capability 122*a-b*. The wireless programmable switching device 110 functions in a similar fashion to the programmable switching device 10 where wirelessly received and transmitted data packets are subject to FPT rules as described above. In some implementations, wireless programmable switching device 110 can contain an embedded controller 156, as is shown in programming switching device 150.

Once the set of defined rules are configured into the programmable switching device of the disclosed technology, unauthorized access into or out of networked devices is nearly impossible as each networked device is completely isolated based on an authorized access model that is not possible with other network technologies.

Unique features of the programmable switching device of the disclosed technology can include: (1) a LAN firewalling approach based on the IP and MAC address of a networked device, (2) flow policy-based segmentation through security controls on a shared LAN, (3) SDN-based LAN controls, e.g., switch or controller-based policy management, (4) automated flow detection and flow policy template creation, (5) flow acceptance and management, (6) prevention of unwanted outbound (north-bound) flows and potential data leakage and (7) a distributed firewall policy across a single or multiple LANs (or VLANs).

The programmable switching device of the disclosed technology is also capable of operating on a networked device's source IP Address (IPv4 or IPv6) and MAC Address and used as a transparent Layer 2 device that can be invisible to other LAN networked devices. In some implementations, the programmable switching device can also transparently operate on other elements of the network frame header, packet header, or the contents of the network frame or packet.

The programmable switching device of the disclosed technology can also create firewall policies via a source and destination IP and/or MAC address that allows for the creation of Flow Policy Segments (FPS) within the LAN and between LANs (or VLANs). The programmable switching device of the disclosed technology can further create a firewall-based, closed-communication path between networked devices on a LAN or across LANs (or VLANs). For example, Flow Policy Segments can permit flows from an individual source address or IP address block to an individual destination address or IP address block optionally with additional attributes such as, but not limited to, protocol type and port numbers. In other implementations, FPSes can be applied between two or more programmable switching devices through federation, described more fully below.

In contrast to conventional firewalls with relatively few ports and very large sets of rules, the programmable switching device of the disclosed technology can utilize smaller sets of firewall rules that can be distributed across a much broader number of network ports and applied to all networked devices on the individual network ports or to specified networked device IP addresses.

The programmable switching device of the disclosed technology can further rely upon SDN to dynamically identify, track, and create policies to constrain network flows through the creation of Flow Policy Templates which then can be applied to a networked device's IP address. SDN also enables Flow Policy Templates to set Whitelist rules and govern their operation, discussed more fully below.

A template-type approach to the Flow Policy Template and its underlying Access Control Lists also enables the programmable switching device to apply operations such as, e.g. substitutions and processing logic, to elements and attributes of the Flow Profile Templates and its Access Control Lists, and thereby the port filters, to create a unique dynamic and adaptable network access paradigm. Data such as, e.g. the NodeID, frame or packet header and contents, real-time network flow data, and data from external sources can be leveraged to adjust the characteristics and behavior of Flow Policy Templates, Flow Policy Segments, and Flow Policy Groups as required by the dynamic needs of the evolving security policy. A language is employed to facilitate the application of these dynamic adjustments, through the use of operations, including e.g. pattern matching, substitutions, arithmetic operations, comparisons, and processing logic.

The programmable switching device of the disclosed technology can additionally operate in a centralized or distributed configuration with a switch acting as a controller or with a dedicated controller.

The programmable switching device of the disclosed technology can also operate as a traditional switch (non-firewalled) or in a programmable mode. Global setting of the programmable switching device can be used to force all ports to operate in a programmable mode to avoid gaps in a security posture. In some implementations, a hybrid configuration is required with a combination of ports operating in either mode.

The programmable switching device of the disclosed technology and its controller can identify new flows on the network and characterize the nature of the flow as: Inside to Outside, Inside to Inside, Outside to Outside, Source and Destination Addresses, Protocol, and Port Numbers. In some implementations, the programmable switching device can also characterize other elements of the network frame header, packet header, or the contents of the network frame or packet.

If a new flow for a networked device is detected, an alert can be triggered as per a configured policy to either allow, deny, or await approval. Additionally, all flows can be registered within a Flow Policy Template and "Open" ports can operate with a Flow Policy Template that allows "any to any" flows.

The programmable switching device of the disclosed technology and its controller can generate alerts on anomalous traffic patterns which are inconsistent with the policy templates and could indicate malicious or undesired activity. For example, a networked device generating an excessive number of dynamic flows which cannot be constrained by a policy template with a scalable, finite number of rules will trigger a fallback to a traditional stateful firewall scheme or send an audible or written alert to a network administrator.

Flow Policy Templates can be created based on a flow acceptance model, e.g., (1) "Open Mode"—allows all flows (2) "Learning Mode"—the controller allows and tracks all flows through that port and develops a Flow Policy Template describing the traffic, (3) "Approval Mode"—all new flows must be manually approved before they're permitted through the port and to the networked device, thereby manually creating a Flow Policy Template, (4) "Restrictive Mode"—normal operation with a Flow Policy Template active and restricting traffic on the switch port and (5) "Stateful Mode"—allow all outbound flows statefully; deny all nonstateful inbound flows with approved exceptions. Other modes are contemplated.

In one implementation, a Whitelisting model can only permit flows explicitly allowed by a Flow Policy Template. Flows not appearing within a Flow Policy Template are not permitted to enter a Flow Policy Segment, thereby preventing undesired in-bound traffic, such as network scans or attacks. Flows not appearing within a Flow Policy Template are not permitted to leave a Flow Policy Segment, thereby preventing undesired out-bound traffic, such as network scans, attacks, attempts to integrate with other software, or contact a third party. This implementation prevents data leakage outside of a Flow Policy Segment by only allowing outbound flows which conform to a Flow Policy Template.

In another implementation, Operational Technology (OT) and Internet of Things (IoT) devices characteristically lack enterprise-level features to securely log into and access a network. Such networked devices can only be identified by the network with a NodeID, e.g., MAC Address, IP Address (IPv4 or IPv6, Classless Inter-Domain Routing (CIDR) Notation) or combinations thereof. The disclosed technology can define a network location identification (LocID) using two unique parameters, e.g., a networked device's attachment device, such as a network switch or Wireless Access Point (WAP), and an attachment identifier, such as the port on the network switch or Wireless Association ID. In this scenario, LocID can equal (Switch ID+Switch Port) or (WAP+Wireless Association ID), etc. These network location identifier designations establish locations for all the networked devices on a network, e.g., LocNodeID=LocID+NodeID In use, when switches are federated across an enterprise, the network can recognize the NodeID and LocNodeID across its topology. Using these designations, the novel disclosed technology allows for security policies to span the entire network. For example, a virtual topology (vTopology) can be created allowing for multiple topologies on one set of physical infrastructure, the creation of a virtual switch construct which can span one or more physical programmable switching devices, or to group programmable switching devices together for different use cases (e.g., administrative domains). Other virtual topology uses are being contemplated. Networked device location within a virtualized network topology can be, e.g., (vTopLocID=vTopologyID+LocID) or (vTopLocNodeID=vTopologyID+LocNodeID).

Additionally, the behavior of a networked device on the network can be characterized through its unique transmissions as data flows through the programmable switching device to which it is connected. The set of a networked device's flows can be characterized by Software Defined Networking (SDN) techniques and represented as a Flow Policy Template (FPT). For example, as described above, Operational Technology (OT) and Internet of Things (IoT) devices typically don't generate large numbers of unique and dynamic flows but rather a limited number of repeat flows: to, e.g., a management system, a manufacturer's servers, or between like devices, etc. These traffic patterns can be learned, characterized, templated, and programmed into the programmable switching device of the disclosed technology via SDN technology. In other words, characterizing flow patterns generated by Operational Technology (OT) and Internet of Things (IoT) devices can be relatively easy as their flow types are limited in number as compared to interactive devices used by people, e.g., desktops, laptops, handhelds in which the flow patterns are much more complex.

Moreover, networked devices which communicate with one another can share a common Flow Policy Template or parts of different Flow Policy Templates which are interlinked. Each networked device's network location ID (vTopLocNodeID) can be linked to an FPT, which contains an inbound and outbound Access Control List. The Access Control Lists of an FPT are, e.g., Whitelists, specifying what traffic to allow and deny all else.

The Flow Policy Template can be structured to designate: FPT ID, Direction (Inbound or Outbound as each connected networked device must have both), Linked FPS (F SP ID to which this FPT is linked), Source (vTopLocNodeID and must be the connected networked device on Inbound FPTs), Protocol (IP Protocol Type), Port (Port number or Protocol Sub-identifier and can be dynamic for dynamic client-side port numbers), Destination (vTopLocNodeID and must be the target networked device on Outbound FPTs), Action (the action taken on this flow and can include Permit/deny or Software Defined (SDN controlled)) and Default Final Rule (cannot be removed-Deny traffic from all networked devices to all networked devices (forces Whitelisting)). Other Actions and FPT elements are contemplated.

All newly connected networked devices (or types of networked devices) can have initial FPTs whose template is set to a desired policy allowing for templated security controls for classes of like devices, e.g., application of an FPT containing the FPS ID it is linked to with the desired policy.

In another implementation, a Flow Policy Template (FPT) can be linked to a NodeID of a networked device. This FPT can follow a computer or a networked device throughout the network. In this implementation, although the programmed filters are applied to a port on a switch that a protected networked device is connected to at a given moment (or the wireless association/connection the computer is maintaining), if the protected networked device is disconnected from one port on a switch and moved to another port on the same or a different switch (or if the protected computer moves wirelessly from one room to another and shifts to another WAP), the rules for this networked device within the FPT can be applied to its new port.

That is, the FPT can be shifted from the original switch port to the new port (or from the original wireless association ID to the new wireless association ID). The shifting of the FPT can be done by the controller because the controller has oversight over all of the switches (or WAPs) on the network. In this implementation, the switch (or WAP) can also have intelligence to alert the controller that the protected computer has moved and can accept the programming of the FPT's filters on a new port (or wireless association).

Networked devices can also be isolated or segmented on a network through the application of Flow Policy Templates across one or more programmable switching devices to create Flow Policy Segments (FPS). An FPS is a collection of FPTs which are interlinked to create a holistic network policy enforced by an Access Control List on every networked device's network connection. Each FPS has an inbound and an outbound Flow Policy. The Flow Policy Segment is a private communications path protected on all switch ingress and egress ports via Access Control Lists reflecting the security controls expressed within its FPTs.

Nothing can enter or exit an FPS unless it is explicitly permitted by an FPT linked to that FPS.

The Flow Policy Segment can be structured to designate FPS ID, FPS Name (32 character text (no spaces)), Description (255 character free-form printable text), Topology ID (the vTopology ID to which this FPS is a member), FPT List (a list of all FPTs linked to this FPS). An FPT can have an inbound and outbound direction, creating a bi-directional policy on an FPS. FPTs can be templated for classes of like networked devices, e.g. all networked devices, a subset of networked devices, or types of networked devices. Other FPS elements are contemplated.

SDN techniques can learn the behavior of classes of networked devices and apply learned or defined FPTs as templates for large numbers of like networked devices (i.e., video surveillance cameras, card access readers, building sensors, etc.) across a small or large network footprint consisting of one or more programmable switching devices. The FPT is applied to a vTopLocNodeID or members of a like class of vTopLocNodeIDs via SDN and can be maintained dynamically as a device's use of the network evolves due to updates, etc. SDN can also be used to dynamically determine the action of an access rule within an FPT (i.e., permit/deny or Software Defined).

Figure 7:
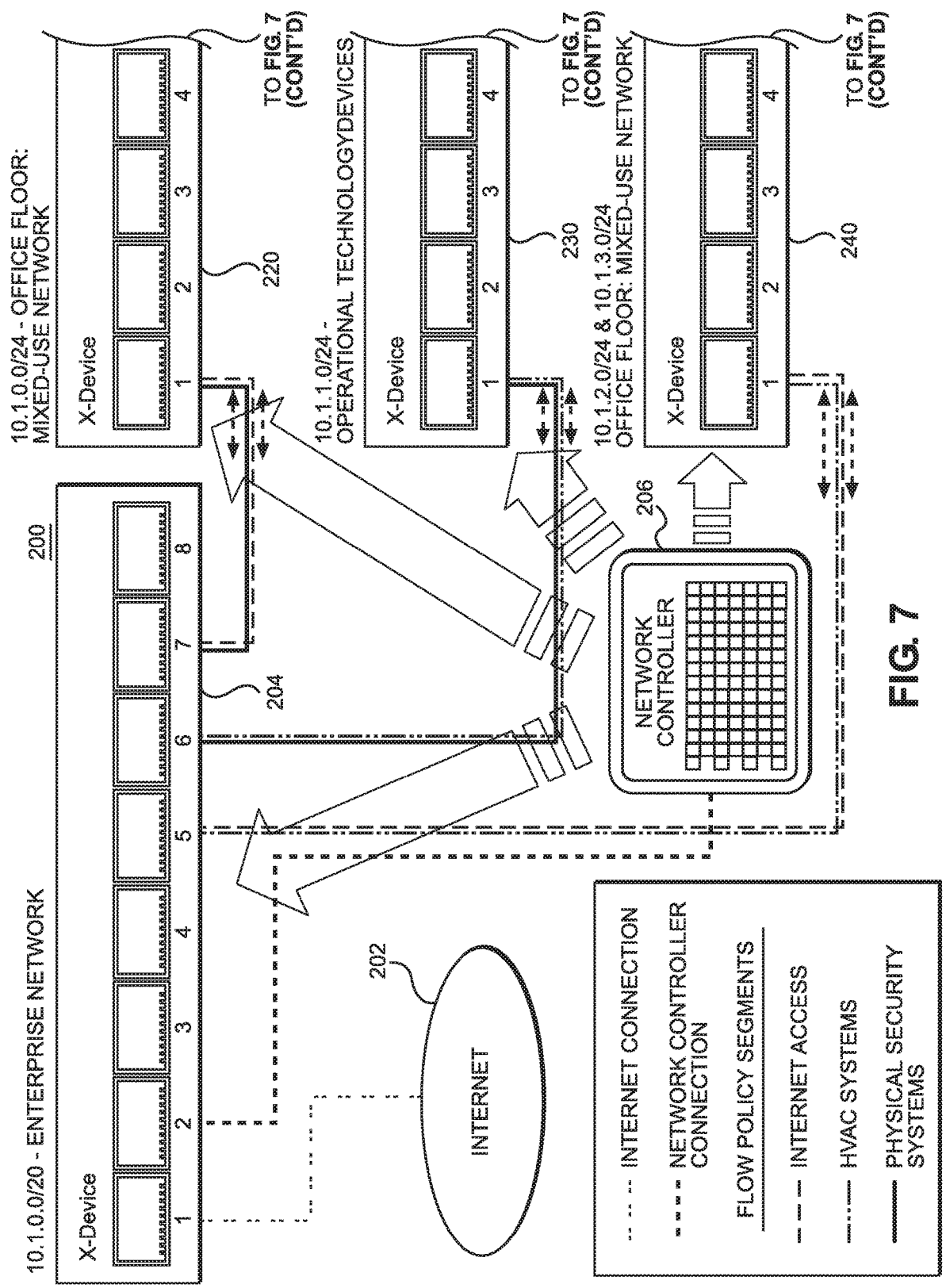
FIG. 7 is an illustrative example of a network utilizing the programmable switching device of the disclosed technology.
Figure 7:
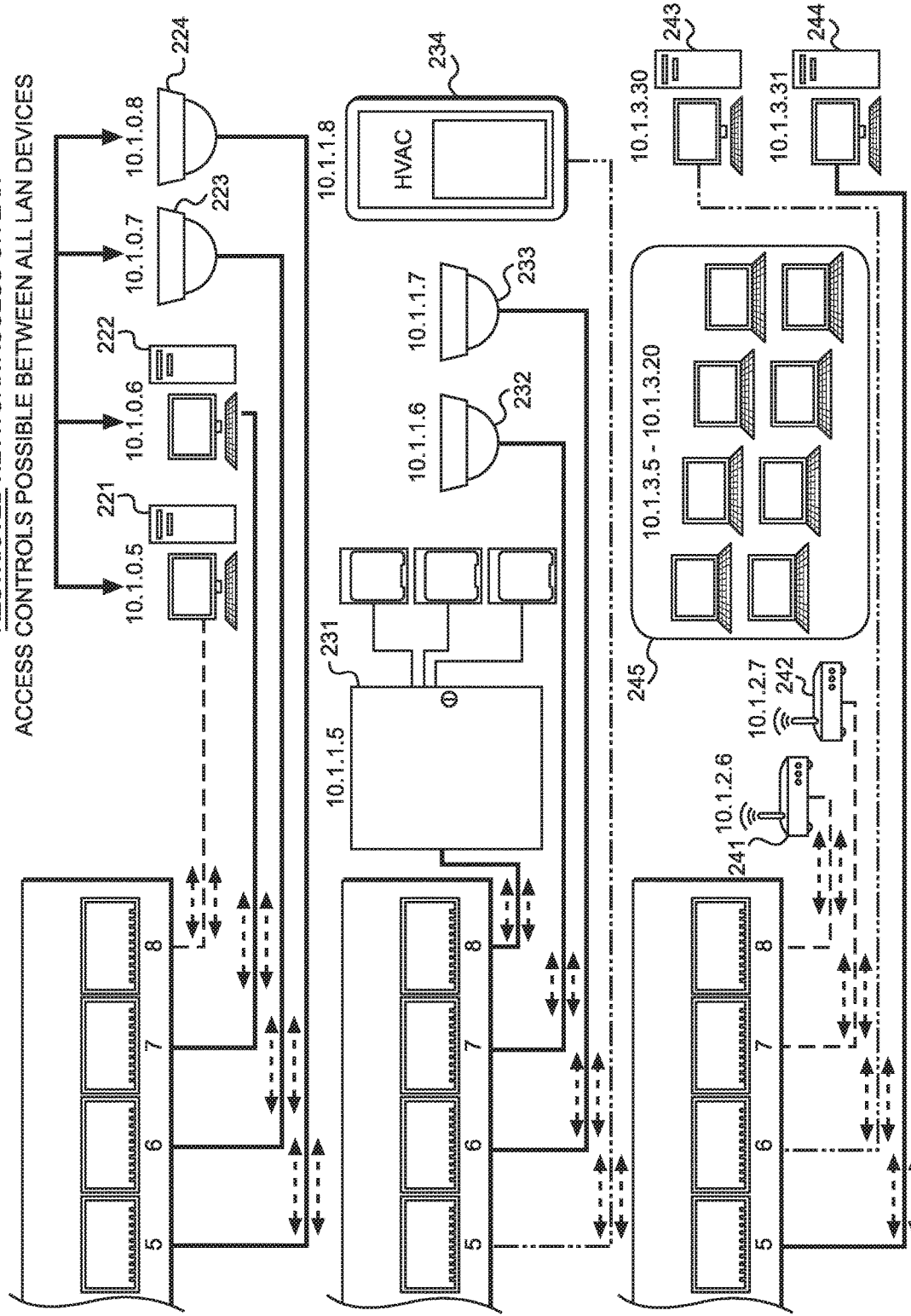

FIG. 7 shows an example of a network structure 200 utilizing programmable switching devices of the disclosed technology. In FIG. 7, an enterprise network switching device 204 can be a first tier switching device for the network structure 200. The enterprise network switching device 204 can be communicatively connected to the Internet 202 at Port 1, the network controller 206 at Port 2 and one or more second tier switching devices, e.g., a mixed-use switching device 220 at Port 7, an OT switching device 230 at Port 6 and a mixed-use switching device 240 at Port 5.

The mixed-use switching device 220 can be communicatively coupled to several different types of networked devices, e.g., desktop computers 221, 222 at Ports 8,7, respectively and Security cameras 223, 224 at Ports 6, 5 respectively. The OT switching device 230 can be communicatively coupled to several building infrastructure networked devices, e.g., a physical security control panel 231 at Ports 8, Security cameras 232, 233 at Ports 7, 6 respectively and HVAC management station 234 at Port 5. The mixed-use switching device 240 can be communicatively coupled to several different types of networked devices, e.g., desktop computers 243, 244 at Ports 6, 5, respectively and wireless access points 241, 242 at Ports 8, 7 respectively. Wireless access points 241, 242 can be wirelessly connected to, e.g., one or more laptop computers 245.

In use, the network controller can program the individual filters with a firewall rule or Access Control List for each port of the enterprise network switching device 204, the mixed-use switching devices 220, 240 and the OT switching device 230, as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing or executing instructions and one or more memory devices for storing instructions and data. Generally, a computer will also include or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Embodiments of the subject matter described in this specification can be implemented in a computing system that includes a back-end component, e.g., a controller, a data server and middleware component, e.g., an application server or front-end components, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the disclosed technology and that various modifications may be implemented by those skilled in the art without departing from the scope and spirit of the disclosed technology. Those skilled in the art could implement various other feature combinations without departing from the scope and spirit of the disclosed technology. Although the embodiments of the present disclosure have been described with specific examples, it is to be understood that the disclosure is not limited to those specific examples and that various other changes, combinations and modifications will be apparent to one of ordinary skill in the art without departing from the scope and spirit of the disclosed technology which is to be determined with reference to the following claims.

What is claimed is:

1. A method comprising:
    identifying, by one or more network devices of a network infrastructure, a first data packet destined for a first connected device communicatively coupled to a first port of a programmable switch device;
    identifying, by the one or more network devices, a first tuple including a first node identifier identifying the first connected device, the first node identifier generated using a first MAC address of the first connected device, a first IP address assigned to the first connected device, and a first communications protocol over which the first data packet is to be transmitted to the first connected device;
    determining, by the one or more network devices, to restrict transmission of the first data packet to the first connected device responsive to applying, to the first data packet, one or more network policies using the first node identifier of the first tuple and a first port identifier identifying the first port of the programmable switching device and a first switch identifier identifying the programmable switching device, wherein the one or more network policies are configured by a controller included in the one or more network devices responsive to analyzing data flow characteristics of data packets routed through the one or more network devices;
    dropping, by the one or more network devices, the first data packet prior to transmission to the first connected device;
    identifying, by the one or more network devices, a second data packet destined for the first connected device;
    identifying, by the one or more network devices, a second tuple including a second node identifier identifying the first connected device, the second node identifier generated i) using at most two of a) the first MAC address, b) the first IP address, or c) the first communications protocol and ii) using at least one of a) a second MAC address of the first connected device, b) a second IP address assigned to the first connected device, or c) a second communications protocol over which the first data packet is to be transmitted to the first connected device;
    determining, by the one or more network devices, to allow transmission of the second data packet to the network device responsive to applying, to the second data packet, the one or more network policies using the second node identifier of the second tuple; and
    transmitting, by the one or more network devices, the second data packet to the first connected device.

2. The method of claim 1, wherein the first tuple includes a first source IP address assigned to a first source device from which the first data packet originated and wherein the second tuple includes either the first source IP address or a second source IP address assigned to the first source device from which the second data packet originated.

3. The method of claim 1, wherein the first tuple includes a first source IP address assigned to a first source device from which the first data packet originated and wherein the second tuple includes a second source IP address assigned to a second source device from which the second data packet originated.

4. The method of claim 1, wherein the programmable switch device is a first programmable switch device and the method further comprising:
identifying, by the one or more network devices, a third data packet destined for the first connected device communicatively coupled to a second programmable switch device;
identifying, by the one or more network devices, a third tuple including a third node identifier identifying the first connected device, the third node identifier generated i) using at most two of a) the first MAC address, b) the first IP address, or c) the first communications protocol and ii) using at least one of a) a second MAC address of the third connected device, b) a second IP address assigned to the first connected device, or c) a second communications protocol over which the first data packet is to be transmitted to the first connected device;
determining, by the one or more network devices, to restrict transmission of the third data packet to the first connected device responsive to applying, to the third data packet, the one or more network policies using the third node identifier of the third tuple; and
dropping, by the one or more network devices, the third data packet prior to transmission to the first connected device.

5. The method of claim 1, wherein the programmable switch device is a first programmable switch device and the method further comprising:
identifying, by the one or more network devices, a third data packet destined for a second connected device communicatively coupled to a second programmable switch device;
identifying, by the one or more network devices, a third tuple including a third node identifier identifying the second connected device, the third node identifier generated using a second MAC address of the second connected device, a second IP address assigned to the second connected device and a communications protocol over which the third data packet is to be transmitted to the second connected device;
determining, by the one or more network devices, to restrict transmission of the third data packet to the second connected device responsive to applying, to the third data packet, the one or more network policies using the third node identifier of the third tuple; and
dropping, by the one or more network devices, the third data packet prior to transmission to the second connected device.

6. The method of claim 1, wherein the one or more network policies include a set of defined rules.

7. The method of claim 1, wherein the one or more network policies are configured by at least one machine learning algorithm, Artificial Intelligence (AI) or automation technique.

8. The method of claim 1, wherein the first tuple includes the first port identifier identifying the first port of the programmable switching device and the first switch identifier identifying the programmable switching device.

9. The method of claim 1, wherein the one or more network devices includes a controller and wherein the controller is configured to maintain a list of switch identifiers including a first switch identifier identifying the programmable switch device and a second switch identifier identifying a second programmable switch device.

10. A system comprising:
one or more network devices including one or more processors, the one or more network devices configured to:
identify a first data packet destined for a first connected device communicatively coupled to a first port of a programmable switch device;
identify a first tuple including a first node identifier identifying the first connected device, the first node identifier generated using a first MAC address of the first connected device, a first IP address assigned to the first connected device, and a first communications protocol over which the first data packet is to be transmitted to the first connected device;
determine to restrict transmission of the first data packet to the first connected device responsive to applying, to the first data packet, one or more network policies using the first node identifier of the first tuple, and a first port identifier identifying the first port of the programmable switching device and a first switch identifier identifying the programmable switching device, wherein the one or more network policies are configured by a controller included in the one or more network devices responsive to analyzing data flow characteristics of data packets routed through the one or more network devices;
drop the first data packet prior to transmission to the first connected device;
identify a second data packet destined for the first connected device;
identify a second tuple including a second node identifier identifying the first connected device, the second node identifier generated i) using at most two of a) the first MAC address, b) the first IP address, or c) the first communications protocol and ii) using at least one of a) a second MAC address of the first connected device, b) a second IP address assigned to the first connected device, or c) a second communications protocol over which the first data packet is to be transmitted to the first connected device;
determine to allow transmission of the second data packet to the network device responsive to applying, to the second data packet, the one or more network policies using the second node identifier of the second tuple; and
transmit the second data packet to the first connected device.

11. The system of claim 10, wherein the first tuple includes a first source IP address assigned to a first source device from which the first data packet originated and wherein the second tuple includes either the first source IP address or a second source IP address assigned to the first source device from which the second data packet originated.

12. The system of claim 10, wherein the first tuple includes a first source IP address assigned to a first source device from which the first data packet originated and wherein the second tuple includes a second source IP address assigned to a second source device from which the second data packet originated.

13. The system of claim 10, wherein the programmable switch device is a first programmable switch device and the one or more network devices further configured to:
identify a third data packet destined for the first connected device communicatively coupled to a second programmable switch device;

identify a third tuple including a third node identifier identifying the first connected device, the third node identifier generated i) using at most two of a) the first MAC address, b) the first IP address, or c) the first communications protocol and ii) using at least one of a) a second MAC address of the third connected device, b) a second IP address assigned to the first connected device, or c) a second communications protocol over which the first data packet is to be transmitted to the first connected device;

determine to restrict transmission of the third data packet to the first connected device responsive to applying, to the third data packet, the one or more network policies using the third node identifier of the third tuple; and drop the third data packet prior to transmission to the first connected device.

14. The system of claim 10, wherein the programmable switch device is a first programmable switch device and the one or more network devices further configured to:

identify a third data packet destined for a second connected device communicatively coupled to a second programmable switch device;

identify a third tuple including a third node identifier identifying the second connected device, the third node identifier generated using a second MAC address of the second connected device, a second IP address assigned to the second connected device and a communications protocol over which the third data packet is to be transmitted to the second connected device;

determine to restrict transmission of the third data packet to the second connected device responsive to applying, to the third data packet, the one or more network policies using the third node identifier of the third tuple; and drop the third data packet prior to transmission to the second connected device.

15. The system of claim 10, wherein the one or more network policies include a set of defined rules.

16. The system of claim 10, wherein the one or more network policies are configured by at least one machine learning algorithm, Artificial Intelligence (AI) or automation technique.

17. The system of claim 10, wherein the first tuple includes the first port identifier identifying the first port of the programmable switching device and the first switch identifier identifying the programmable switching device.

18. The system of claim 10, wherein the one or more network devices includes a controller and wherein the controller is configured to maintain a list of switch identifiers including a first switch identifier identifying the programmable switch device and a second switch identifier identifying a second programmable switch device.

19. The system of claim 10, wherein the one or more network policies include a set of defined rules that creates network security-based isolation between the networked devices.

20. The system of claim 10, wherein the one or more network policies include a set of defined rules that creates network security-based segmentation between the networked devices.

* * * * *